April 12, 1966     A. NAZARETH, JR     3,246,176
MAGNETIC FLOW METER CIRCUIT UTILIZING FIELD EFFECT TRANSISTORS
Original Filed Oct. 19, 1962
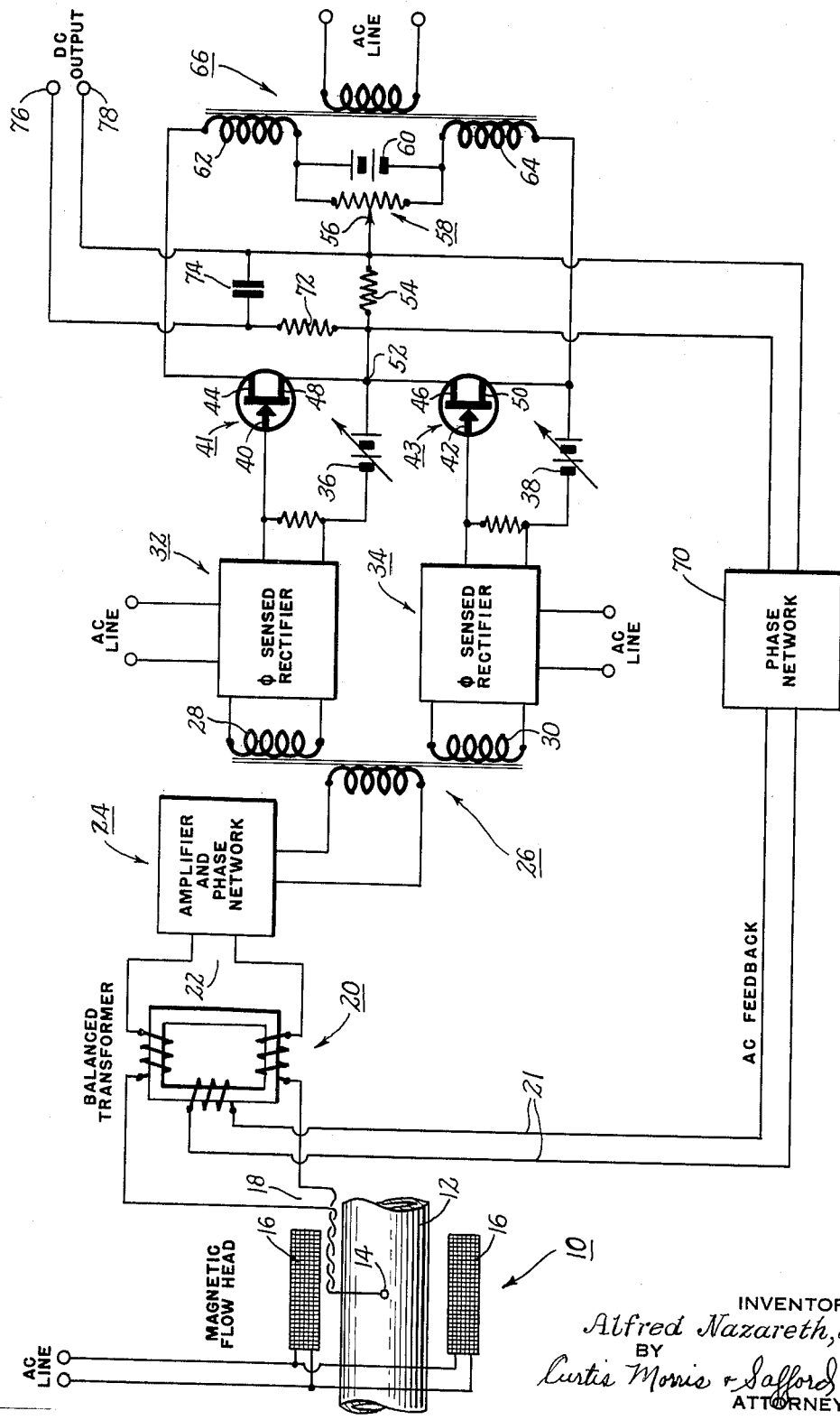
INVENTOR
*Alfred Nazareth, Jr.*
BY
*Curtis Morris & Safford*
ATTORNEYS

United States Patent Office 3,246,176
Patented Apr. 12, 1966

3,246,176
MAGNETIC FLOW METER CIRCUIT UTILIZING FIELD EFFECT TRANSISTORS
Alfred Nazareth, Jr., Rehoboth, Mass., assignor to The Foxboro Company, Foxboro, Mass.
Continuation of application Ser. No. 231,711, Oct. 19, 1962. This application Mar. 8, 1965, Ser. No. 443,752
15 Claims. (Cl. 307—88.5)

This application is a continuation of my application, Serial No. 231,711, filed October 19, 1962.

This invention relates to signal translating apparatus. More particularly, this invention relates to apparatus for producing a transmittable output signal responsive to the amplitudes of two signals. In the disclosed embodiment, the invention is applied to a magnetic flow meter transmitter and operates to maintain the transmitted output signal proportional to flow rate in spite of variation in the A.-C. voltage supplied to the magnetic field coils.

In the A.-C. magnetic flow meter the true measure of flow velocity is the ratio of the magnitude of the A.-C. flow signal to the magnitude of the A.-C. voltage supplied to the field coils. This is because the flow signal is proportional to the product of flow velocity and magnetic field and the latter varies directly with voltage applied to the field coils. Thus, if an instrument is used which measures simply the magnitude of the flow signal voltage, it will be necessary to supply the field coils from an accurately regulated A.-C. supply, an elaborate and expensive device particularly in the case of a magnetic flow meter with its large power requirements. On the other hand, using an instrument which measures the ratio of flow signal to field coil supply voltage renders unnecessary the use of an A.-C. regulator and allows the construction of a much simpler and more economical flow meter system. The system considered here will convert the millivolt per volt signal from an A.-C. magnetic flow meter, or any ratio of two A.-C. voltages, to a transmittable D.-C. output. It could be used with a resistance thermometer bridge with an A.-C. supply.

In such a system an A.-C. error signal, the difference between the A.-C. flow signal and an A.-C. feedback signal obtained from the output, is fed to the attenuation network through a high-gain amplifier and through phase shifters, rectifiers, and such other devices as are required to obtain a suitable control signal for the attenuation network. The D.-C. output from the attenuation network is then taken as the required output; the A.-C. output is taken as the feedback signal. Now the attenuation network has the property that:

$$\frac{\text{D.-C. Output}}{\text{A.-C. Output}} = \frac{\text{D.-C. Supply}}{\text{A.-C. Supply}}$$

The high-gain amplifier operating in the feedback loop will tend to minimize the error signal, and therefore, to maintain an essential equality between the A.-C. output of the attenuation network, the feedback signal, and the A.-C. flow signal. Using this equality, and rearranging the previous equation, there results:

$$\text{D.-C. Output} = \frac{\text{A.-C. Flow Signal}}{\text{A.-C. Supply}} \times \text{D.-C. Supply}$$

Therefore, by using the voltage supplied to the coils of the magnetic flow meter as the A.-C. supply to the attenuation network, and maintaining the D.-C. supply constant, the system will produce a D.-C. output proportional to the ratio of the A.-C. flow signal to the A.-C. voltage supplied to the field coils. One form of such a magnetic flow meter transmitter is described in U.S. Patent 3,131,560, issued to R. W. Cushman et al. on May 5, 1964.

In such application it is, of course, important that an exact proportionality exist, in the attenuation network, between the degree of attenuation of the A.-C. supply and that of the D.-C. supply, since it is on this relationship that the accuracy of the final measurement depends. Notwithstanding such performance requirements, this device should also be relatively simple, reliable in operation, and capable of being produced economically.

Accordingly it is an object of this invention to provide improved signal translating apparatus. The following description should be considered together with the accompanying drawing, which is a diagrammatic representation of a flow meter system incorporating a preferred embodiment of the invention. While this description deals specifically with the application of the invention to a flow meter system, other specific objects, aspects, and advantages of the invention will be apparent from, or will be pointed out in the description which follows.

Referring now to the drawing, there is shown a conventional magnetic flow head 10 comprising a flow pipe 12 having electrodes 14 on opposite sides thereof, and a pair of coils 16 connected to the A.-C. power line to produce a magnetic field within the pipe. The electrodes 14 are connected through a pair of leads 18 to a balanced difference transformer 20, e.g., as shown in detail in U.S. Patent 3,006,188. This transformer combines the A.-C. flow signal on leads 18 and the negative feedback signal from leads 21, and produces on leads 22 a signal corresponding to the difference between the flow signal and the feedback signal.

This difference signal on leads 22 is fed to the input of an amplifier 24, for example a transistor amplifier as shown in the above-identified Cushman patent. This amplifier also includes a conventional phasing network (not shown herein) which corrects for phase shift introduced by the magnetic flow head 10, and produces at the amplifier output an A.-C. signal which is in phase (or 180° out-of-phase) with respect to the A.-C. line voltage.

This amplified A.-C. signal is fed to a transformer 26 having a pair of isolated secondaries 28 and 30. These secondaries are connected to respective phase-sensed rectifiers 32 and 34 which are supplied with comparison signals from the A.-C. power line. The two rectifier circuits are so arranged that they produce a zero D.-C. output when the A.-C. input signal fed thereto is zero or 90° out-of-phase with respect to the A.-C. line voltage, and therefore with respect to the amplified flow signal. Each rectifier produces a D.-C. output of one polarity when the input signal is in phase with the line voltage and a D.-C. output of opposite polarity when the input signal is 180° out-of-phase with the line voltage. The use of phase-sensed rectifiers not only renders the system sensitive to the phase of the flow signal, and therefore to the direction of the flow, but renders it insensitive to quadrature signals, spurious signals 90° out-of-phase with respect to the flow signal, the bulk of which are generated by magnetic induction in the flow meter head. The output circuits of these rectifiers are oppositely polarized, that is to say, for a given phase of input signal, say in phase with the line voltage, the D.-C. output of the upper rectifier 32 might vary from zero to plus 4 volts, while the output of the lower rectifier 34 varies from zero to minus 4 volts.

The D.-C. output potentials of the phase-sensed rectifiers 32 and 34 are fed in as control signals to an attenuation network consisting in this case of the two field-effect transistors 41 and 43 and their associated components. The field effect transistors have gate electrodes 40 and 42, drain electrodes 44 and 46, and source electrodes 48 and 50. Field-effect transistors are well known in the art (see, for example, U.S. Patent 3,001,111, 3,007,119 and 3,010,033), and the characteristics thereof are available in various publications. One of the important characteristics of field-effect transistors is that the relationship between drain-source voltage and drain current at low drain-source voltage, and at any particular value of gate-source voltage, is essentially that of a pure resistance, at least over a limited range of operation. That is to say, the A.-C. incremental resistance, the slope of the drain characteristic at a particular point, is equal to the D.-C. static resistance, the ratio of voltage to current at that point. In addition, this effective resistance varies markedly with changes in the voltage applied to the gate electrode, e.g., this resistance may change by a factor of 1000:1 for a moderate variation such as 4 volts, in the potential applied to the gate electrode. These are the characteristics required for proper operation of the attenuation network. Other devices with the same pure resistance characteristic such as photo-diodes, thermistors, and magneto-resistive devices might well be equally suitable.

The two field-effect transistors 41 and 43 are connected together in a form of bridge circuit. The common junction 52 therebetween is connected through a load resistance 54 to the movable arm of a potentiometer 58. This potentiometer is connected across a D.-C. energizing source 60, and between a pair of secondary windings 62 and 64 of a transformer 66, the primary of which is connected to the A.-C. power line. The remote ends of these are connected respectively to the drain electrode 44 of the upper field-effect transistor. In essence this attenuation network functions as a bridge, the two field-effect transistors, or alternate devices, forming a voltage divider fed simultaneously from an A.-C. and a D.-C. supply. If this network is to have the required characteristics, that is, that the ratio of A.-C. output to A.-C. supply be equal, or at the very least proportional, to the ratio of D.-C. output to D.-C. supply, then it is important for a practical device that the voltage divider elements, the field-effect transistors or alternate devices, function as variable pure resistors. That is, the effective drain-source resistance, in the case of field-effect transistors, must be the same for both A.-C. and D.-C. at any given control signal. If this condition is satisfied then the ratio A.-C. output to A.-C. supply is, in fact, equal to the ratio D.-C. output to D.-C. supply.

When there is no A.-C. signal at the output of the amplifier 24, i.e., when there is no flow through the pipe 12, the potential applied to the gate electrodes 40 and 42 will be equal, e.g., minus 4 volts. Thus the resistances presented by the field-effect transistors 41 and 43 will be equal, and accordingly the potential of the common junction 52 will be essentially midway between the potentials of the drain electrode 44 and the source electrode 50. The potentiometer 58 is adjusted so that, in this condition, the potential of its movable arm 56 is equal to the potential of junction 52. Thus, there will be no A.-C. or D.-C. output across the load resistance 54.

When liquid flows through the pipe 12, the resulting A.-C. output of the amplifier 24 will produce corresponding D.-C. potentials at the outputs of the phase-sensed rectifiers 32 and 34, e.g., plus 1 volt from rectifier 32 and minus 1 volt from rectifier 34. The potentials applied to gate electrodes 40 and 42 will change correspondingly, e.g., to minus 3 volts at electrode 40 and minus 5 volts at electrode 42. Thus, the resistance of field-effect transistor 41 will decrease and the resistance of field-effect transistor 43 will increase, with the result that the potential of junction 52 will no longer be equal to the potential of the movable arm 58 of the potentiometer 60.

Accordingly, an output signal will appear across load resistance 54 with a magnitude corresponding to the D.-C. potential produced by the phase-sensed rectifiers 32 and 34. This output signal will comprise an A.-C. output signal and a D.-C. output signal, since the field-effect transistors are supplied with current from both an A.-C. energizing circuit (transformer 66) and a D.-C. energizing circuit (D.-C. supply 60). If the impedance of the sensing circuit changes, as with a change in the resistances of the field-effect transistors, and provided both the A.-C. and D.-C. supplies remain constant, the resulting change in the D.-C. output signal will be accompanied by an exactly proportional change in the A.-C. output signal, since both output signals are developed by the flow of current through the same circuit elements.

The A.-C. signal developed across the load resistance 54 is fed through a phase network 70 and leads 21 to the difference transformer 20 to oppose the A.-C. flow signal received from leads 18. The phase network 70 adjusts the phase of this A.-C. feedback signal so that it matches the phase of the A.-C. flow signal. Consequently, there will be a "null" at the input to amplifier 24, since this amplifier has a very high gain, and the A.-C. feedback signal will have effectively the same amplitude as the A.-C. flow signal. With this relationship established, any change in the A.-C. flow signal resulting from a change in flow rate will necessarily result in an exactly corresponding change in the D.-C. output signal across load resistance 54, since this D.-C. output signal will "track" the A.-C. output signal across the load resistance. However, if the A.-C. flow signal changes as a result of variations in the A.-C. line voltage supplying the coils 16 there will be substantially no effect on the D.-C. output signal because the line voltage variation will produce a corresponding change in the A.-C. feedback signal, thus tending to prevent any variation in the difference signal on leads 22. In other words the device is insensitive to line voltage variations because it measures the ratio of flow signal to line voltage.

The D.-C. output signal across load resistance 54 is fed through a filter network, consisting of resistor 72 and capacitor 74, to a pair of output terminals 76 and 78. From there, the D.-C. signal may be transmitted to a remote station, possibly with additional amplification if required, and applied to a flow indicating or recording instrument in a conventional manner.

It should be understood that the disclosure herein is only intended as an illustration of the present invention, and it is apparent that numerous modifications may be made within the scope of this invention. For example, the magnetic flow meter transmitter may include a bias arrangement in order to provide the D.-C. output signal with a "live zero." Also, it should be understood that the showing herein is diagrammatic in certain respects, e.g., the D.-C. sources 36, 38 and 60 are indicated as batteries, but in an actual transmitter such D.-C. sources will consist of conventional electronic D.-C. power supplies the details of which are well known.

I claim:

1. Electrical signal-responsive apparatus adapted for use as a D.-C. transmitter and comprising, in combination, an amplifier for intensifying an A.-C. input signal, rectifier means connected to the output of said amplifier for developing a D.-C. potential responsive to changes in the amplitude of said A.-C. input signals; two field-effect transistors each having a pair of current-carrying electrodes and a gate electrode, first circuit means connecting a current-carrying electrode of one of said field-effect transistors to a current-carrying electrode of the other transistor; A.-C. and D.-C. energizing means having a pair of principal output terminals providing both A.-C. and D.-C. energizing voltages and a third output terminal providing a potential intermediate the potentials of said principal output terminals; means connecting said pair of principal output terminals respectively to the other current-carrying electrodes of said field-effect transistors to produce a flow of A.-C. and D.-C. current through said two transistors in series; second circuit means for providing to said gate electrodes control signals corresponding to said D.-C. potential, said second circuit means including means to provide an inverse relationship between said control signals such that as the resistance of one of said field-effect transistors is increased the resistance of the other of said transistors is decreased; an impedance element coupled between said first circuit means and said third output terminal of said means to produce across said impedance element A.-C. and D.-C. output signals corresponding to the potential of said first circuit means as determined by the relative resistances of said two field-effect transistors; and negative feedback means coupled to said impedance element and arranged to direct to the input of said amplifier a feedback signal corresponding to said A.-C. output signal.

2. Apparatus as claimed in claim 1, wherein said A.-C. energizing means comprises a transformer having a two-section secondary winding, the remote ends of said secondary winding sections being coupled to said other current-carrying electrodes and the adjacent winding ends being coupled to one terminal of said impedance element, the other terminal of said impedance element being connected to said first circuit means.

3. Apparatus as claimed in claim 2 wherein said D.-C. energizing means comprises a D.-C. power supply connected between said winding sections.

4. Apparatus as claimed in claim 3 including a potentiometer connected across said D.-C. power supply, the movable arm of said potentiometer being connected to said one terminal of said impedance element.

5. Apparatus as claimed in claim 1 wherein said rectifier means comprises a pair of phase-sensed rectifiers each having an output connected to the gate electrode of a respective field-effect transistor.

6. For use in an industrial process instrumentation system, an electronic transmitter for producing a direct-current output signal corresponding to the value of a process condition and adapted for use with condition-sensing means of the type energized by an A.-C. supply source to produce an A.-C. measurement signal responsive to the value of the process condition and also to the amplitude of the A.-C. supply voltage; said transmitter comprising, in combination, a high gain amplifier to receive said A.-C. measurement signal, a variable attenuation network including means responsive to the amplifier output signal for altering the attenuation of said network in accordance with changes in the A.-C. input signal fed to said amplifier; a D.-C. power supply; circuit means coupling said A.-C. supply source and said D.-C. power supply to the input of said attenuation network to produce corresponding A.-C. and D.-C. output signals at the output of said attenuation network, whereby the amplitude of the A.-C. output signal is made responsive both to the output of said amplifier and to the amplitude of the A.-C. supply voltage and the magnitude of the D.-C. output signal correspondingly is made responsive both to the output of said amplifier and the magnitude of the D.-C. supply voltage; and negative feedback means coupling said A.-C. output signal to the input of said amplifier in opposition to said A.-C. measurement signal.

7. Signal-responsive apparatus comprising an amplifier adapted to receive an input signal; a variable attenuation network having an input and an output and including at least one variable impedance element the impedance of which controls the attenuation presented by said network, said variable impedance element having a control terminal independent of said input and output of said network; first circuit means for directing to said control terminal a signal responsive to the output of said amplifier for controlling the impedance of said variable impedance element and thereby controlling the amount of attenuation presented by said network; A.-C. and D.-C. energizing means coupled to the input of said attenuation network to produce at the output of said network corresponding A.-C. and D.-C. ouput signals the magnitudes of which vary together with changes in the amount of attenuation presented by said network; and negative feedback means coupling one of said output signals to the input of said amplifier.

8. Apparatus as claimed in claim 7, wherein said impedance element is an electronic device the resistance of which varies with changes in an applied control signal.

9. For use in an industrial process instrumentation system, an electronic transmitter for producing a direct-current output signal corresponding to the value of a process condition and adapted for use with condition-sensing means of the type energized by an A.-C. supply source to produce an A.-C. measurement signal responsive to the value of the process condition and also to the amplitude of the A.-C. supply voltage; said transmitter comprising in combination: a high-gain amplifier arranged to receive said A.-C. measurement signal and to produce a corresponding output signal; a variable attenuation network having an input circuit to receive electrical signals to be attenuated, impedance means forming part of said network and connected in the path of current flow produced by said electrical signals, an output circuit coupled to said impedance means to produce an output voltage from said network responsive to the amount of said current flow; said network impedance means including a controllable impedance element with means responsive to said amplifier output signal for setting the impedance of said element in correspondence to the magnitude of said amplifier output signal, thereby causing the attenuation of said network to be altered in accordance with changes in the A.-C. input signal fed to said amplifier; a D.-C. power supply; circuit means coupling said A.-C. supply source and said D.-C. power supply to said input circuit of said attenuation network to produce corresponding A.-C. and D.-C. output voltages at said network output circuit, whereby the amplitude of said A.-C. output voltage is proportional both to the output signal of said amplifier and to the amplitude of the A.-C. supply voltage and the magnitude of said D.-C. output voltage correspondingly is proportional both to the output signal of said amplifier and the magnitude of the D.-C. supply voltage; and negative feedback means for developing an A.-C. feedback signal corresponding to said A.-C. output voltage and for coupling said feedback signal to the input of said amplifier in opposition to said A.-C. measurement signal.

10. Signal-responsive apparatus comprising amplifier means adapted to receive an input signal; a variable attenuation network having an input circuit to receive electrical signals and including impedance means connected in the path of current flow developed by said electrical signals, an output circuit for said network and coupled to said impedance means to develop output signals corresponding to said electrical signals; said impedance means including a resistive element the resistance of which is controllably variable; means responsive to the output of said amplifier for controlling the resistance of said element in correspondence with said amplifier output, thereby to control correspondingly the attenuation produced by said network; A.-C. and D.-C. energizing means coupled to said input circuit of said attenuation network to supply thereto corresponding electrical energizing signals having alternating and non-alternating directional characteristics, respectively, said energizing signals producing current flow through said impedance means and developing at said output circuit of said network corresponding A.-C. and D.-C. output signals, the amount of said current flow being variable with changes in the resistance of said controllable element as determined by said amplifier output so that said A.-C. and D.-C. output signals vary in correspondence to changes in said input signal applied to said amplifier means; and negative feedback means for said amplifier means, said feedback means coupling one of said amplifier output signals in opposition to said input signal, said one output signal having the same directional characteristics as said amplifier input signal so that the resultant signal applied to the input of said amplifier represents the difference in magnitude between said input signal and the feedback signal developed by said feedback means.

11. Apparatus as claimed in claim 10, wherein said impedance element comprises a field-effect transistor having a gate electrode which is coupled to the output of said amplifier, so that the resistance of said transistor is controllable by said amplifier output.

12. Apparatus for use with A.-C. condition-measurement systems, such as a magnetic flowmeter, to convert an A.-C. condition-responsive signal to a corresponding D.-C. output signal, said apparatus comprising, in combination, an amplifier for intensifying the A.-C. signal, rectifier means connected to the output of said amplifier for developing a D.-C. potential responsive to changes in the amplitude of said A.-C. signal; an attenuation network including a field-effect transistor and an impedance element connected in series therewith, circuit means for feeding said D.-C. potential to the gate electrode of said field-effect transistor, A.-C. and D.-C. energizing means coupled to said attenuation network to produce corresponding A.-C. and D.-C. current flow through said field-effect transistor and said impedance element in series, the resulting A.-C. and D.-C. output signals across said impedance element having magnitudes controlled by the resistance of said field-effect transistor as determined by the D.-C. potential applied to said gate electrode; and negative feedback means coupling said A.-C. output signal to the input of said amplifier.

13. Apparatus as claimed in claim 12, wherein said impedance element comprises a resistor.

14. For use in an industrial process instrumentation system, an electronic transmitter for producing a direct current output signal corresponding to the value of a process condition, said transmitter being adapted for use with condition sensing means of the type having electrical circuit means energized by an A.-C. supply source for producing an A.-C. measurement signal which is responsive to the value of the process condition and also to the amplitude of the A.-C. supply voltage, the measurement signal being fed to a high gain amplifier the output circuit of which includes means to produce the direct current output signal, said output circuit also including means to produce an A.-C. feedback signal derived from said A.-C. supply and combined with said A.-C. measurement signal to develop for said amplifier a resultant A.-C. input signal which represents the difference between said A.-C. feedback signal and the A.-C. measurement signal; said amplifier output circuit means comprising an all electronic variable attenuation network for simultaneous attenuation of two voltages derived respectively from said A.-C. supply and from a D.-C. supply, so as to produce said A.-C. feedback signal and said direct current output signal with magnitudes in the same ratio as that of the A.-C. and D.-C. supply voltages, and fully electronic means incorporated in the variable attenuation network and responsive to the output of said amplifier to alter the attenuation of said network in accordance with changes in the A.-C. input signal to said amplifier, the relation between said A.-C. supply voltage and said A.-C. feedback signal thus being caused to closely approximate the relation between the A.-C. supply voltage and the A.-C. measurement signal of the sensing means, thereby maintaining the relation between the D.-C. output signal and the D.-C. supply of the variable attenuation network at a value representing the value of the measured condition of the process.

15. Apparatus as claimed in claim 14 wherein said variable attenuation network includes at least one purely resistive element connected to a load element, both of said elements being energized by said A.-C. and D.-C. supplies to produce across said load element A.-C. and D.-C. signals the magnitudes of which vary correspondingly with changes in the resistance of said purely resistive element, and from which said A.-C. feedback signal and said direct current output signal are derived respectively.

References Cited by the Examiner

UNITED STATES PATENTS

| 2,511,855 | 6/1950 | Keck et al. | 330—114 |
| 3,006,188 | 10/1961 | Handel et al. | 73—194 |
| 3,131,560 | 5/1964 | Cushman et al. | 73—194 |

ARTHUR GAUSS, *Primary Examiner.*

R. H. EPSTEIN, *Assistant Examiner.*